F. ANDERSON.
COTTON CHOPPER.
APPLICATION FILED MAY 6, 1914.
1,119,562.
Patented Dec. 1, 1914.
3 SHEETS—SHEET 1.
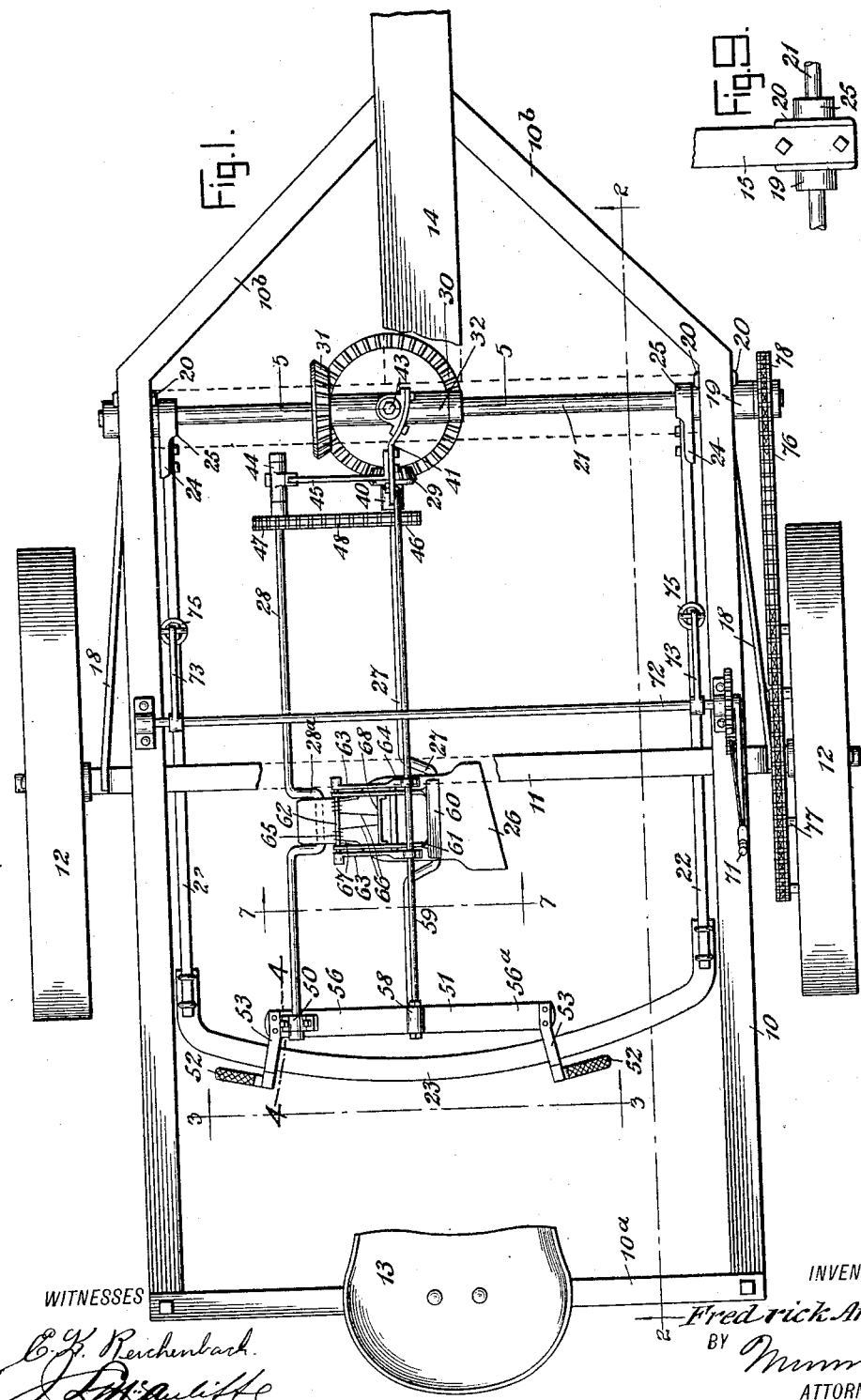
WITNESSES
INVENTOR
Frederick Anderson
BY
ATTORNEYS F. ANDERSON.
COTTON CHOPPER.
APPLICATION FILED MAY 6, 1914.
1,119,562.
Patented Dec. 1, 1914.
3 SHEETS—SHEET 2.
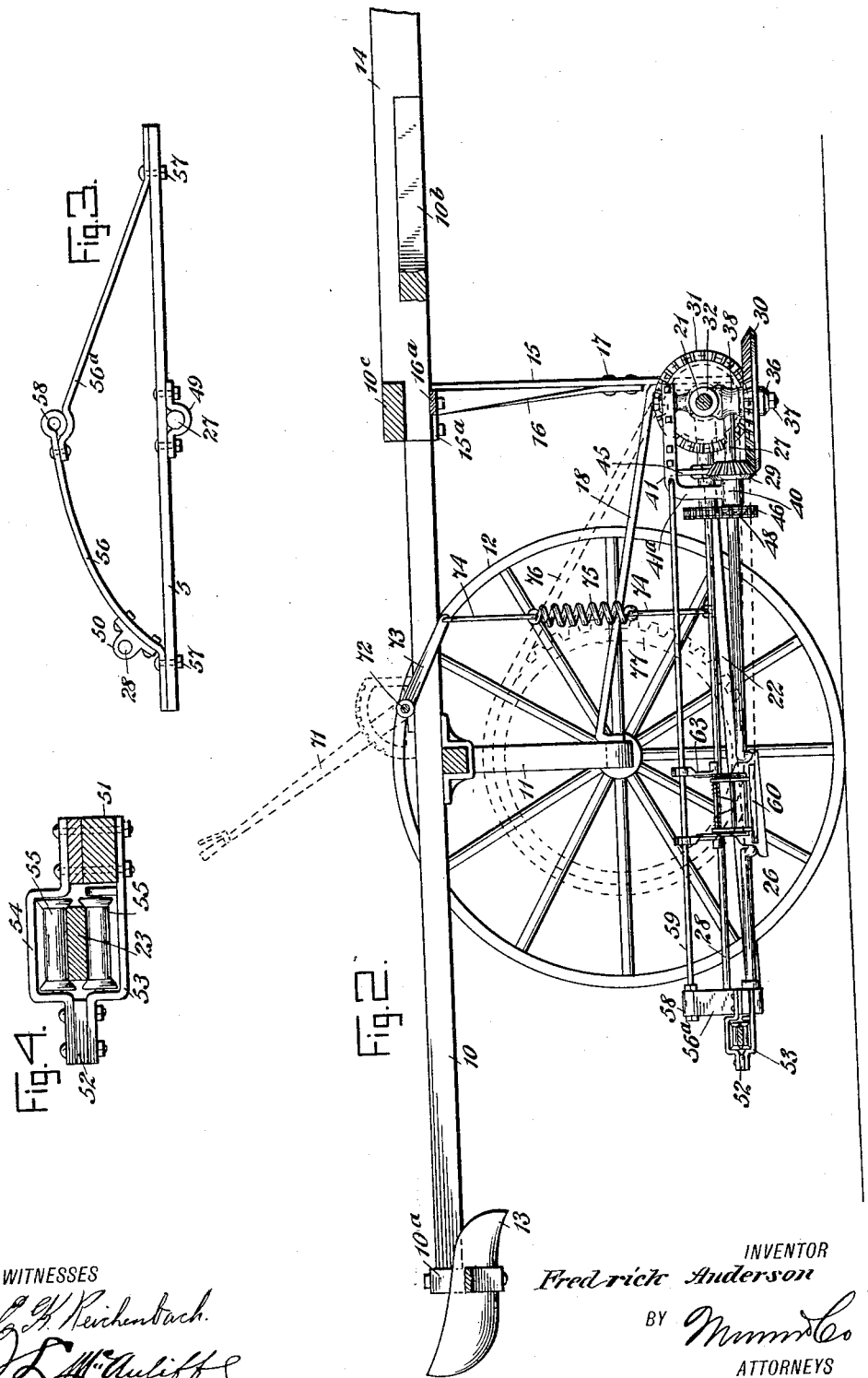
INVENTOR
Fredrick Anderson
BY Munn & Co.
ATTORNEYS
WITNESSES F. ANDERSON.
COTTON CHOPPER.
APPLICATION FILED MAY 6, 1914.
1,119,562.
Patented Dec. 1, 1914.
3 SHEETS—SHEET 3.
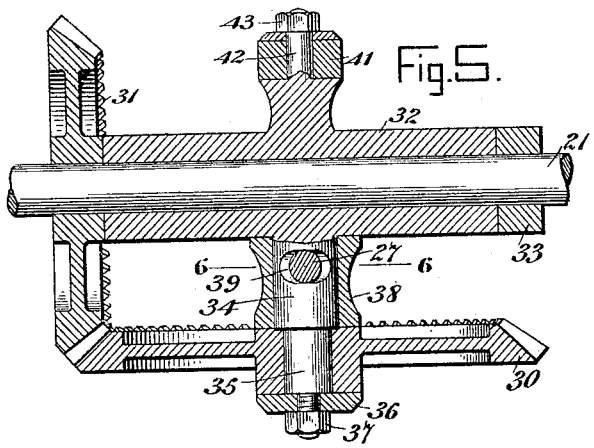
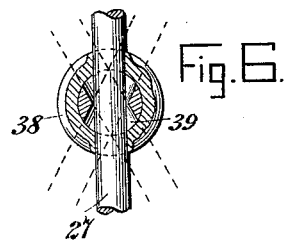
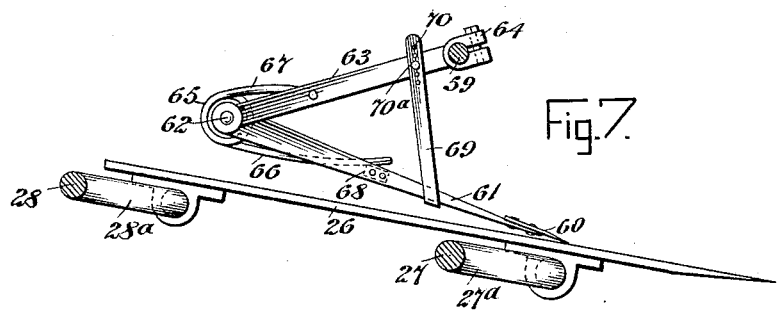
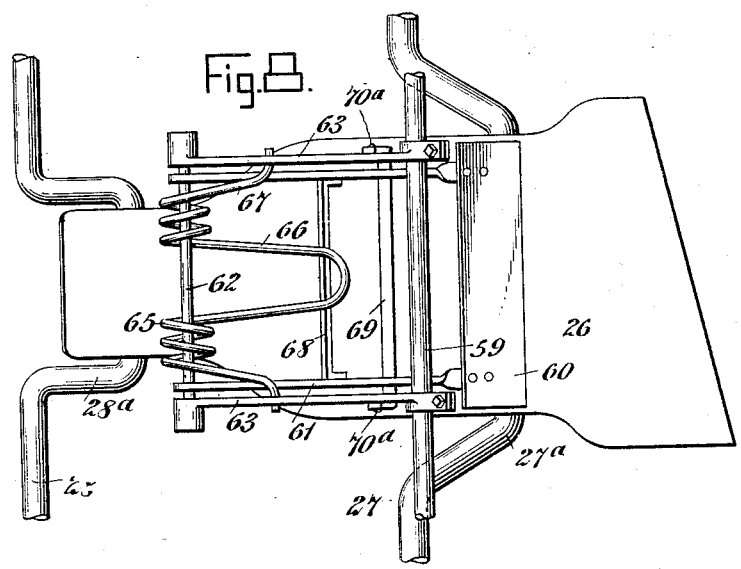
WITNESSES
INVENTOR
Fredrick Anderson
BY
ATTORNEYS

UNITED STATES PATENT OFFICE.

FREDRICK ANDERSON, OF LINDSBORG, KANSAS.

COTTON-CHOPPER.

1,119,562.   Specification of Letters Patent.   Patented Dec. 1, 1914.

Application filed May 6, 1914. Serial No. 836,678.

*To all whom it may concern:*

Be it known that I, FREDRICK ANDERSON, a citizen of the United States, and a resident of Lindsborg, in the county of McPherson and State of Kansas, have invented a new and Improved Cotton-Chopper, of which the following is a full, clear, and exact description.

My invention relates to an agricultural machine for use in chopping out portions of cotton plants in a row, and particularly to a machine for the indicated purpose in which a chopping hoe is given a rotary parallel movement transverse to the direction of travel of the machine, and in which the hoe and its operating means are mounted to be shifted laterally in either direction, and also to be rocked in a vertical plane without breaking the driving connection with the actuating means, the construction being designed to give the driver control of the hoe and its movement so that it may be shifted to adjust the position of the hoe relatively to the row of plants, or to be thrown altogether clear of the row when the row does not require to be thinned.

The invention will be particularly explained in the specific description following.

Reference is to be had to the accompanying drawings forming a part of this specification, in which similar characters of reference indicate corresponding parts in all the views.

Figure 1 is a plan view of a cotton chopper constituting one embodiment of my invention, a portion of the frame and arched axle being omitted in the interest of clearness; Fig. 2 is a longitudinal vertical section on the line 2—2 of Fig. 1; Fig. 3 is a detail end view of the auxiliary frame supporting the chopping hoe and its drive shafts, the view being taken on the line 3—3 of Fig. 1; Fig. 4 is a detail longitudinal vertical section on the line 4—4 of Fig. 1; Fig. 5 is an enlarged view in transverse vertical section on the line 5—5 of Fig. 1, of the actuating gearing for the chopper hoe; Fig. 6 is a detail horizontal section on the line 6—6 of Fig. 5; Fig. 7 is a rear elevation of the chopping hoe and scraper employed in connection therewith; the crank shafts mounting the hoe, and a brace bar being shown in section; Fig. 8 is a plan view of the parts shown in Fig. 7; and Fig. 9 is a fragmentary front view of one of the bearings for the drive shaft and the supporting hanger thereof.

In constructing a practical embodiment of my invention, the frame 10 may be of suitable form to carry the operative parts, said frame being mounted on an arched axle 11 mounting running wheels 12. A seat 13 may be provided on the rear cross bar 10ᵃ of the frame 10, and a tongue 14 is provided at the front and secured to the forwardly extending, convergent sides 10ᵇ of the frame and to a cross bar 10ᶜ.

At the front of the implement hangers 15 are provided at each side; these may be secured at their upper ends to the under side of the frame parts, there being shown (see Fig. 2) a bent upper end 15ᵃ bolted to the under side of the frame. The hangers 15 are located at the sides of the frame, and diagonal braces 16 may extend from said hanger bars to be secured to the latter, as at 17, the braces converging upwardly and inwardly and secured at 16ᵃ adjacent to the center line of the frame. I prefer to employ additional braces 18 extending from the hangers 15 rearwardly to a connection with the arched axle 11. The hanger bars are simply to sustain the operative parts and any equivalent construction will obviously answer.

Secured to the lower ends of the hangers 15, journal boxes or bearings 19 are provided and formed preferably with spaced lugs 20 which receive said hangers. Turning in the boxes 19 is a drive shaft 21, to be actuated by any approved means, as per the example hereinafter referred to, and a carrying frame for the chopping hoe and its shafts is hung on the said shaft, the said frame comprising side bars 22, and a rear curved cross bar 23. The connection of the side bars 22 with the shaft 21 may be by means of lugs 24 on loose collars 25, to which lugs the arms 22 are suitably fastened.

The chopping hoe is designated generally by the numeral 26 and it is mounted adjacent to the forward end on the cranked portion 27ᵃ of a main crank shaft 27, while at the rear portion the said hoe is mounted on the cranked portion 28ᵃ of an auxiliary crank shaft 28. The shaft 27 is driven from the drive shaft 21, for which purpose use is made of a bevel pinion 29 on said crank shaft 27, which meshes with a bevel gear wheel 30, the latter in turn being driven by a bevel wheel 31 fast on the drive shaft 21. The relation of the gearing elements 29, 30 and 31 to each other, to the drive shaft 21 and to the carrying frame 22—23 of the hoe is such that the necessary lateral and vertical movements of the chopping hoe may be effected as hereinafter described. Thus a loose sleeve 32 on the shaft 21 is held between the fixed pinion 31 and a set collar 33 on the shaft, and said sleeve is formed with a depending stud 34 on the reduced portion 35 of which the intermediate gear wheel 30 is loosely mounted. A washer 36 and nut 37 may be employed to sustain the gear wheel 30 in position.

Above the gear wheel 30, between the same and the sleeve 32, there is mounted on the stud 34 a loose collar 38, through which extends the forward end of the main crank shaft 27, the said shaft extending also through the stud 34. The opening in the stud 34 for the passage of the crank shaft is flaring at both front and rear from an approximately central point, so that the sleeve may turn laterally in response to a laterally swinging movement of the shaft 27 and chopping hoe 26.

To provide a bearing for the front end of the shaft 27, in addition to its support in the sleeve 38 and stud 34, a bearing box 40 is carried on the depending end 41$^a$ of a bracket arm 41, said bracket arm being pivotally mounted at its front end on the sleeve 32 at the upper side. In the present instance the arm 41 is adapted to turn through an angle about a vertical stud 42 on said sleeve 32, a nut 43 or equivalent retaining means being employed.

In order to provide a bearing and actuating means for the front end of the crank shaft 28, a laterally extending bracket arm 45 is secured to the bracket 41, and carries a bearing box 44 at its outer end for the said shaft 28. Sprocket wheels 46, 47, are provided on the main crank shaft 27, and auxiliary shaft 28 respectively, and receive a sprocket chain 48, so that the shaft 28 will be driven from the main crank shaft 27, and in unison therewith.

For the rear ends of the crank shafts 27, 28, suitable bearings 49 and 50 are provided on a frame auxiliary to the main hoe frame 22—23. Said auxiliary frame is designated generally by the numeral 51. In order to provide for the ready lateral swinging by the operator of the auxiliary frame 51 and the chopping hoe 26 and its crank shafts 27, 28, foot-rests 52 are formed on rearwardly extending brackets secured to the frame 51. Said brackets advantageously include spaced upper and lower members 53, 54, that mount friction rollers or spools 55 running above and below the transverse curved bar 23. The construction readily permits of the operator shifting the auxiliary frame 51 laterally on the bar 25. The auxiliary frame, in addition to the base bar 51, may consist of an arching top formed of separate side sections 56, 56$^a$, bolted as at 57 to the ends of the base 51. The arched bar has an eye 58 therein, or equivalent formation for the proper fastening of a tie rod or longitudinal brace 59, which extends forwardly to a connection with the bracket 41.

In connection with the chopping hoe which is in the form of a flat blade sharpened at its front end, I employ a scraper 60, which may consist of an oblong plate, as indicated best in Figs. 7 and 8. The said scraper is yieldingly mounted in contact with the upper surface of the hoe so that in the rotary movements of the latter in response to the turning of the crank shafts 27, 28, the upper surface of the hoe will be subjected to the action of the scraper. The said scraper blade 60 is mounted on transversely disposed arms 61, on a longitudinal pivot pin 62 carried by arms 63 which are supported from the rod 59, being secured to the latter by clips 64 or equivalent means. A coil spring 65 on the pivot pin 62 presents members 66, 67, which exert pressure against the arms 61 of the scraper blade and the carrying arms 63. The member 66 of the spring bears against the cross bar 68 extending between the arms 61, while the members 67 of the spring connect with or bear against the arms 63, so that the spring tends to throw the scraper downwardly against the hoe blade 26, but will permit the scraper blade to yield vertically as the hoe rises in response to the turning of the shafts 27, 28. To restrain the extent of the downward movement of the scraper blade, a stirrup 69 may be employed, extending beneath the arms 61 and secured to the upper arms 63. To adjust the stirrup vertically for varying its limiting action on the scraper blade, the stirrup 69 may have a series of holes 70, to receive the pins 70$^a$ entering the arms 63. The described arrangement of the scraper enables the latter to effectively perform the scraping action on the hoe while conforming to the movements of the latter.

In order to provide for lifting the main rocker frame 22—23 clear of the row of plants, a lever 71 is provided on a transverse rocker shaft 72 which carries rocker arms 73 connected with the side members 22 of the main hoe frame. The connection between the rocker arms 23 and the bars 22 is preferably effected by means of link members 74 having retractile springs 75 interposed therebetween.

In the present instance the drive shaft 21 is actuated from one of the running wheels 12, there being provided for the purpose a sprocket wheel 77 on the running wheel 12, and a sprocket pinion 78 on the drive shaft 21, over which wheel and pinion a sprocket chain 76 runs, so that the turning of the running wheel will actuate the drive shaft.

The described construction affords a practical means for carrying my invention into effect, and I would state in conclusion that I do not limit myself strictly to the mechanical details herein illustrated, since manifestly the same can be considerably varied without departure from the spirit of the invention.

Having thus described my invention, I claim as new and desire to secure by Letters Patent:

1. In an apparatus of the character described, a frame pivoted at one end to swing vertically, a second frame pivoted at one end to swing laterally, and also movable vertically with the swinging of the first frame, a chopper implement, and chopper-operating means carried by said laterally swinging frame, a drive shaft, and a drive element on the shaft, there being a driven element comprised in said operating means and driven by said drive element.

2. In an apparatus of the character described, a drive shaft, a frame, a loose sleeve on the drive shaft, one end of said frame being supported on the said sleeve to swing in a plane parallel with the axis of the sleeve, means for rocking said frame and sleeve on the drive shaft, a loose member supported on the sleeve approximately at a right angle to the axis of the latter, a shaft journaled in said frame and having one end extending transversely through the said loose member, a drive pinion fast on the drive shaft adjacent to the sleeve, a loose wheel driven by said pinion on the drive shaft and supported on the sleeve approximately parallel with the latter, a driven wheel on the shaft journaled in the frame and driven by said loose wheel, and a chopper implement operated by the shaft on the frame.

3. In an apparatus of the character described, a drive shaft, a drive pinion on said shaft, a loose sleeve on said drive shaft, a stud extending from the sleeve at approximately right angles thereto, a loose sleeve on the said stud, a crank shaft extending at one end through the last mentioned sleeve, said stud having a flaring opening receiving the end of the crank shaft, a wheel loose on the stud and driven by the drive pinion on the shaft, a pinion on the crank shaft driven by said loose wheel, a frame in which the crank shaft is journaled, one end of the frame being supported on the first-mentioned sleeve to swing in a plane parallel with the axis of the sleeve, means for rocking said frame and the sleeve on the drive shaft through an angle about said drive shaft, and a chopper implement on the frame and operated by the crank shaft.

4. In an apparatus of the character described, a horizontal drive shaft, a frame pivoted at one end on the drive shaft to rock vertically, a loose member on the shaft, a second frame pivotally supported at one end on said loose member and at its other end on the first frame, to rock vertically with the latter, the pivotal connection of the second frame permitting a transverse swinging movement on the loose member, means for vertically rocking the first frame through an angle about the drive shaft, pedals on the second frame, to swing it laterally, a chopper implement on the second frame, and means for operating said implement from the drive shaft.

5. In an apparatus of the character described, a horizontal drive shaft, a loose sleeve on the drive shaft, a frame supported at one end on the said sleeve, a chopper implement on said frame, means for operating said chopper implement from the drive shaft, a second frame pivoted to swing in a vertical plane, that end of the first frame opposite its pivot being supported on the second frame, and means for raising and lowering the second frame.

6. In an apparatus of the character described, a chopper implement, means for giving chopping movements to said implement, a scraper implement yieldingly supported for scraping contact with the chopper implement in the movements of the latter, the said scraper comprising supporting arms, carrying arms at an angle to the supporting arms and pivotally connected therewith, a scraper blade pivotally held by said supporting arms, a spring tending to maintain the scraper blade in contact with the chopper and a stop for the supporting arms acting to limit the movement thereof by the spring.

In testimony whereof I have signed my name to this specification in the presence of two subscribing witnesses.

FREDRICK ANDERSON.

Witnesses:
DAVID CEDARHOLM,
CARL PATRICK.

Copies of this patent may be obtained for five cents each, by addressing the "Commissioner of Patents, Washington, D. C."